United States Patent [19]

Othen

[11] Patent Number: 4,795,492

[45] Date of Patent: Jan. 3, 1989

[54] CORROSION INHIBITING COATING COMPOSITION

[75] Inventor: David G. Othen, Sunbury-on-Thames, England

[73] Assignee: The British Petroleum Company p.l.c., London, England

[21] Appl. No.: 96,900

[22] Filed: Sep. 15, 1987

[30] Foreign Application Priority Data

Sep. 18, 1986 [GB] United Kingdom ............... 8622465

[51] Int. Cl.$^4$ .................. C09D 5/08; C23F 11/08; C09K 15/02
[52] U.S. Cl. ................. 106/14.21; 148/6.152; 252/389.52
[58] Field of Search .............. 106/14.21, 1.17, 14.44, 106/290; 148/6.152; 252/389.52

[56] References Cited

U.S. PATENT DOCUMENTS

| | | | |
|---|---|---|---|
| 2,913,419 | 11/1959 | Alexander | 106/15.05 |
| 4,026,710 | 5/1977 | Kennedy | 106/14.21 |
| 4,243,417 | 1/1981 | Grourke et al. | 106/14.13 |
| 4,419,137 | 12/1983 | Cayless et al. | 106/14.44 |
| 4,643,769 | 2/1987 | Othen | 106/1.17 |

Primary Examiner—Paul Lieberman
Assistant Examiner—Helene Kirschner
Attorney, Agent, or Firm—Morgan & Finnegan

[57] ABSTRACT

An aqueous based coating composition comprises particulate zinc and inorganic oxide particles having corrosion inhibiting ions chemically bound to their surface by ion exchange. The composition preferably contains an electrolyte to accelerate the curing reaction.

7 Claims, No Drawings

CORROSION INHIBITING COATING COMPOSITION

The present invention relates to a surface protective coating composition for inhibiting corrosion of metal surfaces particularly ferrous metal surfaces and to articles or structures having ferrous metal surfaces coated with such a composition.

It is well known that a metal surface can be protected against corrosion by placing in electrical contact with the metal surface a second metal of lower standard electrode potential (i.e. a sacrificial metal). A common example of this form of protection is galvanised steel.

The use of sacrificial metal particles, usually finely divided particles, in paints is also known. In particular, it is known to protect steel surfaces with paint containing zinc dust. The known zinc-containing paints may contain organic or inorganic binders such as, for example, epoxy resins or ethyl silicate. Generally the zinc content of such paints is from 70 to 95 per cent by weight and the paints are therefore commonly known as zinc-rich paints.

Zinc-rich paints can provide very good corrosion protection to steel surfaces. However, if left exposed to the environment, a layer of white zinc corrosion products forms relatively quickly on the surface. These corrosion deposits are unslightly and make further coating difficult. Even when the zinc-rich coatings are provided with an overcoat of another paint prior to exposure to the environment, zinc corrosion may cause intercoat adhesion problems and the white zinc corrosion products may still be deposited on the surface.

European Patent specification EP No. 196835A discloses that the problems associated with the zinc corrosion in zinc-rich coating compositions may be reduced by the inclusion in the composition of an effective amount of inorganic oxide particles having corrosion inhibiting ions chemically bound to the surface of the inorganic oxide particles by ion-exchange.

The applications describes a coating compositoin suitable for application to a metal surface to inhibit corrosion comprising
(i) a binder,
(ii) from 50 to 90% by weight of elemental zinc in particulate form based on the weight of the coating composition, and
(iii) an effective amount of inorganic oxide particles having corrosion inhibiting ions chemically bound to the surface thereof by ion-exchange.

The amount of binder can conveniently be in the range of 10 to 60% preferably 15 to 35% by weight based on the weight of the coating composition.

The binders specifically described are based on non-aqueous systems using organic polymers or polymer-forming materials in organic solvents. In the surface coatings specifically described in EP NO. 196835A the binder is responsible for holding the zinc and inorganic oxide particles in place in the surface coating and the durability of the coating would be expected to be reduced if the binder content were reduced to very low levels.

It has now been found that effective coatings can be obtained from compositions containing no binder or low levels of binder by using aqueous-based systems.

Thus, according to the present invention an aqueous-based coating composition suitable for application to a metal surface to inhibit corrosion comprises:

(i) from 50 to 90% by weight of elemental zinc in particulate form based on the weight of the dry coating composition,
(ii) an effective amount of inorganic oxide particles having corrosion inhibiting ions chemically bound to the surface thereof by ion exchange.

Inorganic oxide particles having corrosion inhibiting ions bound to the surface of the inorganic oxide particles by ion-exchange are known as corrosion inhibitors and are disclosed in UK Pat. No. GB 2071070B, European Patent Application No. 46057 and European Patent Application No. 89810. British Patent Application No. 2091235 discloses a method of preparing certain corrosion inhibitors of this type. The disclosure of these publications are incorporated herein by reference.

Any of the ion-exchanged inorganic oxide particles disclosed in these patents and patent applications may be used in the present invention. However, the preferred particles are those in which the ions bound to the inorganic oxide are cations and the preferred inorganic oxide is silica.

Particularly preferred for use in the present invention is a corrosion inhibitor comprising silica particles having calcium ions chemically bound to the particles of the silica by ion-exchange. The inorganic oxide particles preferably have a particle size in the range 0.5–40 microns, more preferably in the range of 1–10 microns.

The inorganic oxide can conveniently contain up to 2.5 millimoles/g of corrosion inhibiting ions. The lower limit can be about 0.01 millimoles/g but is preferably 0.05 millimoles/g.

Typically, the total amount of the elemental zinc and ion-exchanged inorganic oxide contained in the coating composition is from 60 to 95% by weight. The volume ratio of zinc to ion-exchanged inorganic oxide may be, for example, from 1:0.05 to 1:1.2 preferably 1:0.67 to 1:1 or on a weight basis from 75:1 to 3:1.

The coating gains its cohesive strength from the reaction of zinc and ion-exchanged inorganic oxide. This is a slow reaction and the coating cures over an extended period of time; however, the reaction rate can be considerably increased and the cure times reduced to 7 days or less by addition of an electrolyte to the composition. The electrolyte can be added to the composition prior to application to a metal surface or it can be introduced, subsequent to the application (e.g. by spraying). The electrolyte is preferably a simple salt, more preferably sodium chloride. It is usually applied as an aqueous solution, preferably in the concentration range 0.08–1.7 molar; the aqueous solution may conveniently be seawater.

The reaction of zinc and ion-exchanged inorganic oxide gives the applied composition its cohesive strength. However, this curing reaction is relatively slow especially in the absence of electrolyte. To prevent erosion of the coating through the action of wind or water, before the coating has fully cured, a holding agent may optionally be added to the composition. This holding agent will be a film-forming polyer that will give the composition cohesive strength. It will also be water-soluble or water-dispersible. Examples of suitable holding agents are acrylic, styrene-acrylics, vinyl/acrylics, silicone or urethane emulsions. Other emulsion polymers such as epoxy resins are suitable as well as water soluble alkyd or polyester resins.

Where a holding agent is present in the coating, then it is present preferably in an amount such that the pigment volume concentration is at least 70%.

The term pigment volume concentration is defined as the volume conentration of all solids other than the holding agent in the initial dry coating formulation.

Dispersants (e.g. sodium hexametaphosphate) can also be added to the composition.

To prevent evaporation of the water in the composition before the coating has fully cured (through electrolyte action) humectants can be added. Examples of such humectants are ethylene glycol, glymes and polyethylene glycol.

The coating composition may in the form of a paint by which we mean to include enamels, lacquers, varnishes, undercoats, primers, seals, fillers, stoppers and the like.

The composition is dispersed in water, to facilitate application to the surface. The quantity of water is such as to give a paste with viscosity suitable for applying as a fluid coating to the surface. Examples of suitable water contents in the coating composition are 80% to 30%; preferably 65% to 45% based on volume.

The coating composition may also contain additives conventionally used in paints such as, for example, pigments, driers, thickeners and anti-skinning agents.

The coating compositions may be prepared and applied by conventional techniques.

The present invention includes structures comprising a metal surface, particularly a ferrous metal surface coated with a composition as herein described.

The invention is illustrated by the following Examples, 1 to 4.

Tests A, B and C are included for comparative purposes only.

EXAMPLE 1

Zinc and Ca/SiO2 Without Binder

A mixture of 12.25 g zinc dust (Fisons AR Grade) and 2.52 g calcium-exchanged silica (commercial production sample), ie at a volume ratio of 0.55:0.45, were lightly ground in a pestle and mortar with 6.4 g distilled water to produce a smooth brushable mixture, which was applied by brush to an ultrasonically cleaned and degreased 6"×4" polished steel test panel (supplied by Pyrene Chemical Services Ltd) and allowed to dry.

COMPARATIVE TEST A

Zinc and Silica Gel Without Binder (not according to the invention)

A mixture of 12.25 g zinc dust and 2.52 g silica gel (Cecagel Blanc, produced at small particle size by ball-milling in water and spray-drying the resulting slurry) was similarly ground in a pestle and mortar with 12.7 g distilled water. The resulting mixture was very heavily flocculated and would not form a coherent wet film, but was applied by brush to a test panel to the best of the operators's ability. The panel was allowed to dry.

Both coated test panels were subjected to hot Salt Spray according to ASTM B117-73 for 350 hours. At the end of the test, the composition of Example 1 had formed a hard, adherent coating with no sign of corrosion of the steel substrate; the composition of Example 2 showed much less adhesion, and displayed blistering and substrate corrosion. Corrosion assessments and torque shear adhesion measurements are given in Table 1.

EXAMPLE 2

Zinc and Ca/SiO2 with Binder

A mixture of 14.54 g zinc dust, 3.21 g calcium exchanged silica (vol ratio 0.54:0.46), and 3.93 g distilled water were lightly ground together in a pestle and mortar to wet out the pigments. 2.69 g Haloflex 202S resin emulsion (ICI) was then stirred into the mixture, to give a coating compositon of Pigment Volume Concentration 75% and 50% Volume Solids.

COMPARATIVE TEST B

Zinc and silica gel with binder (not according to the invention)

As in Example 2 but replacing the calcium exchanged silica with an equivalent volume (and weight) of fine-ground silica gel.

COMPARATIVE TEST C

Zinc and binder (not according to the invention)

A coating composition made as in Example 2 consisting of 26.44 g zinc dust, 3.93 g distilled wter, and 2.69 g Haloflex 202S. PVC=75%, Volume Solids=50%.

Compositions of Example 2 and Comparative Tests B and C were each applied by brush to two Pyrene test panels (prepared as described in Example 1) and allowed to dry. One panel of each composition was scratched through to the steel substrate and subjected to 350 hours' ASTM B117-73 Salt Spray. After test, the panels were rinsed with distilled water, allowed to dry, and subjected to torque shear adhesion measurements using an Eppricht Twistometer, along with the unexposed panels. Corrosion assessment and adhesion measurements are given in Table 1.

All three compositions effectively prevented substrate corrosion at the scratch; however, the composition of Test C (zinc dust only) showed severe white rust formation and some blistering. The composition of Test B (zinc and silica) showed much less white rust formation, but at the cost of under-film substrate corrosion and through-film brown rust staining. The composition of Example 2 (zinc and calcium exchanged silica) gives the best protection, showing little or no under-film substrate corrosion and minimal surface white rust formation. All three compositions show a marked increase in adhesion on weathering, but the composition of Example 2 shows the greatest effect, although this must be qualified by the mode of failure for the compositions of Tests B and C, which is increasingly at the interface between the coating and the epoxy adhesive by which the adhesion test dolly is fixed. This may also reflect an increasing tendency to intercoat adhesion problems in the order 2<B<C.

EXAMPLE 3

A paint was prepared according to the following formulation:

| | |
|---|---|
| Ultra-fine zinc dust | 250 parts |
| calcium-exchanged silica | 50 " |
| water | 50 " |
| sodium chloride | 2.5 " |

The composition was applied to a smooth steel panel and left to cure at ambient temperature and 100% humidity. Acceptable cure was achieved after 7 days.

EXAMPLE 4

A paint was prepared according to the following two-pack formuation:

| | | | | | | Part A |
|---|---|---|---|---|---|---|
| Ultra-fine zinc dust | 50 | | | | | |
| polyethylene glycol 400 | 10 | | | | | |
| calcium-exchanged silica | 10 | | | | | Part B |
| water | 25 | | | | | |
| calgon | 0.4 | | | | | |
| sodium chloride | 0.4 | | | | | |

Parts A and B were mixed immediately before application in the ratio shown. The composition was applied to a steel panel and cured in less than 2 days.

TABLE 1

Results of ASTM B117-73 Salt Spray and Torque Shear Adhesion Test Results on Coatings Based on Zinc Dust and Calcium/Silica

| | | Corrosion Test Results | | | | Before/After Salt-Spray | Torque Shear Adhesion N mm$^{-2}$ (Mean) | Adhesion Tests Results | | |
|---|---|---|---|---|---|---|---|---|---|---|
| | | | | | | | | Failure Mode % | | |
| | | | | | | | | Adhesive | | |
| Ex | Composition | Blistering$^a$ | White$^b$ Rust | Brown$^b$ Rust | Under-Film$^b$ Corrosion | | | Paint-Metal | Paint-Epoxy | Cohesive |
| 1 | Zn—Ca/SiO$_2$ No binder | 10 | 3 | 10 | 10 | Before After | approx. 0$^c$ 13.4 | — 100 | — 0 | — 0 |
| A | Zn—SiO$_2$ No binder | 2 M | 5 | 6 | 3 | Before After | approx. 0$^c$ less than 10$^d$ | — — | — — | — — |
| 2 | Zn—Ca/SiO$_2$ Haloflex 202S | 10 | 7 | 10 | 10 | Before After | 8.6 21.7 | 0 85 | 0 15 | 100 0 |
| B | Zn—SiO$_2$ Haloflex 202S | 10 | 5 | 4 | 2 | Before After | 8.8 16.7 | 0 60 | 0 40 | 100 0 |
| C | Zn Haloflex 202S | 6 M | 0 | 10 | 10 | Before After | 4.4 15.9 | 0 2 | 0 93 | 100 5 |

$^a$Assessment according to ASTM D714 where 10 = good (no blisters), 0 = bad (very large blisters). Letters designate frequency F = few, M = medium, D = dense
$^b$Assessment accordint to ASTM D610 where 10 = good (no corrosion), 0 = bad (100% corroded)
$^c$Coating too weak to measure
$^d$Estimated value. Porous and irregular nature of coating prevented attachment of test dolly Haloflex is an emulsion in water of a vinyl/acrylic copolymer incorporating vinyl chloride and vinylidene dichloride

I claim:

1. An aqueous-based coating composition having a water content of 30 to 80% by weight suitable for application to a metal surface to inhibit corrosion comprises:
   (i) from 50 to 90% by weight of elemental zinc in particulate form based on the weight of the dry coating composition,
   (ii) an effective amount of inorganic oxide particles having corrosion inhibiting ions chemically bound to the surface thereof by ion exchange.

2. A coating composition as claimed in claim 1 wherein any holding agent present in the coating is in an amount such that the pigment volume concentration is at least 70%.

3. A coating compositon as claimed in claim 1 wherein there is present an electrolyte.

4. A coating composition as claimed in claim 3 wherein the electroyte is sodium chloride.

5. A coating composition as claimed in claim 1 wherein the inorganic oxide is silica and the corrosion inhibiting ions are calcium cations and the amount of silica having calcium cations chemcially bound to the surface thereof by ion exchange is from 1.25% to 15% by weight based on the weight of the coating composition.

6. A coating composition as claimed in claim 1 wherein there is present a dispersant.

7. A coating composition as claimed in claim 1 wherein there is present a humectant

* * * * *

UNITED STATES PATENT AND TRADEMARK OFFICE
CERTIFICATE OF CORRECTION

PATENT NO. : 4,795,492
DATED : January 3, 1989
INVENTOR(S) : David George Othen

It is certified that error appears in the above-identified patent and that said Letters Patent is hereby corrected as shown below:

```
Column 1, line 28, "unslightly" should read --unsightly--.
Column 1, line 41, "applications" should read --application--.
Column 2, line 59, "polyer" should read --polymer--.
Column 3, line 10, after "may" insert --be--.
Column 3, line 55, "operators's" should read --operator's--.
Claim 5, line 4, "chemicially" should read --chemically--.
```

Signed and Sealed this

Thirtieth Day of May, 1989

Attest:

DONALD J. QUIGG

Attesting Officer

Commissioner of Patents and Trademarks